United States Patent
Tai et al.

(10) Patent No.: US 8,692,406 B2
(45) Date of Patent: Apr. 8, 2014

(54) AIR-GUIDING CARRIER TYPE WIND POWER COLLECTION DEVICE

(75) Inventors: Chang-Hsien Tai, Pingtung County (TW); Shi-Wei Lo, Pingtung County (TW); Uzu-Kuei Hsu, Pingtung County (TW)

(73) Assignee: National Pingtung University of Science & Technology, Neipu Hsiang (TW)

( * ) Notice: Subject to any disclaimer, the term of this patent is extended or adjusted under 35 U.S.C. 154(b) by 331 days.

(21) Appl. No.: 13/280,402

(22) Filed: Oct. 25, 2011

(65) Prior Publication Data
US 2013/0043688 A1 Feb. 21, 2013

(30) Foreign Application Priority Data

Aug. 18, 2011 (TW) .............................. 100129567 A

(51) Int. Cl.
*F03D 9/00* (2006.01)
*H02P 9/04* (2006.01)

(52) U.S. Cl.
USPC .......................................................... 290/55

(58) Field of Classification Search
USPC ............ 290/55, 44; 415/2.1; 416/85; 244/30, 244/97, 96, 24
See application file for complete search history.

(56) References Cited

U.S. PATENT DOCUMENTS

| 8,052,082 B1 * | 11/2011 | Herlik | 244/30 |
| 2008/0048453 A1 | 2/2008 | Amick | |
| 2010/0140390 A1 | 6/2010 | Goodall | |
| 2010/0259050 A1 | 10/2010 | Meller | |
| 2013/0043687 A1 * | 2/2013 | Tai et al. | 290/55 |
| 2013/0043689 A1 * | 2/2013 | Tai et al. | 290/55 |

* cited by examiner

*Primary Examiner* — Javaid Nasri
(74) *Attorney, Agent, or Firm* — Alan Kamrath; Kamrath IP Lawfirm, P.A.

(57) ABSTRACT

An air-guiding carrier type wind power collection device includes a floating body and two air guiding tubes. The floating body includes a compartment filled with an uprising gas having a density lower than that of air. The floating body includes a floating assembly controlling a pressure and a temperature of the uprising gas received in the compartment. The air guiding tubes extend through the compartment of the floating body. Each air guiding tube has an air inlet and an air outlet. The air outlet includes a peripheral wall having a windward section and a guiding section. The peripheral wall has a cutout portion formed between the windward section and the guiding section. An air channel is formed between and in communication with the air inlet and the air outlet of each air guiding tube. A wind power generating assembly is mounted in each of the air channels.

12 Claims, 5 Drawing Sheets

AIR-GUIDING CARRIER TYPE WIND POWER COLLECTION DEVICE

BACKGROUND OF THE INVENTION

1. Field of the Invention

The present invention relates to an above-ground type wind power collection device and, more particularly, to an air-guiding carrier type wind power collection device that can stably stay in the air while providing enhanced wind power generating efficiency.

2. Description of the Related Art

Regardless of using either horizontal or vertical shaft type wind power generators, the performance of current wind power generation is affected by the installation site. When mounted on the ground, the electricity output of the wind power generators is greatly affected by the atmospheric boundary layer flow due to the terrain. By comparison, the atmospheric flow in the upper air has a static wind velocity and strong wind. Thus, devices or systems capable of staying in the air are another option of current development of offshore wind power generation. Currently, horizontal shaft type wind power generators utilizing the upper air current include a tower or column structure that has a high manufacturing cost and that is difficult to maintain and repair while having a limitation to the height of the tower or column structure. Thus, it is impossible to timely adjust the height of the wind power generator or the windward face responsive to the changeable upper-air climate. As a result, when the wind in the upper air is either too small or too strong and changes its direction, the normal energy transmission mechanism of the wind power generator will be adversely affected, failing to provide the required generating efficiency.

Nowadays, air-floating carriers, such as flying boats and balloons, are developed to carry generating mechanisms to the upper air for collecting the wind power to generate electricity that is subsequently transmitted to the ground. Such development is an important option for use of recycled energy. As an example, when a commercial airplane equipped with a small turbofan looses its power, electricity can be generated by the relative speed and can be used in navigation or a communication system. The literature also discloses that a flying boat can be equipped with a wind power generating device so that the wind power generating device can obtain the required wind power for normal operation when the flying boat is in the upper air. Thus, the wind energy can be used for generating electricity.

Since the wind power generating device mounted to a flying boat depends on a large fan that is mounted to an outer side of the flying boat so as to be driven by the strong wind in the upper air for generating electricity. However, the large fan requires large power to drive the vanes of the fan. Namely, strong wind in the upper air is required for generating electricity. Continuous generation of electricity can not be maintained, leading to low generating efficiency and ineffective use of wind energy in the upper air.

Furthermore, the direction of the air currents in the upper air is changeable, causing violent wobbling of the carrier carrying the wind power generating device and adversely affecting normal operation of the wind power generating device. Thus, it is difficult to collect and use the abundant wind energy in the upper air in a stable state and at a stable height. The application values of conventional techniques of air-floating carriers are not satisfactory. As a result, air-floating carriers can not completely replace conventional tower or column type wind power generating mechanisms, which is an extreme waste of the abundant wind energy in the upper air.

Thus, to solve the above-mentioned disadvantages, a need exists for a novel wind power collection device that can effectively collect and use the energy of the strong wind in the upper air while stably staying at a suitable height in the upper air having steady strong wind.

SUMMARY OF THE INVENTION

An objective of the present invention is to solve the above-mentioned disadvantages by providing an air-guiding carrier type wind power collection device that can effectively collect the wind energy by using the characteristics of the upper air, increasing the velocity and density of the air current in the upper air to increase the wind power generating efficiency.

Another objective of the present invention is to provide an air-guiding carrier type wind power collection device that can reduce the adverse effect by the resistance and the directional change of the air current in the upper air by using an aerodynamic configuration like an aircraft, so that the wind power collection device can stably stay at a suitable height in the upper air.

A further objective of the present invention is to provide an air-guiding carrier type wind power collection device that can utilize a temperature difference to create a floating effect for actively adjusting the height, so that the wind power collection device can stay at the suitable height in the upper air.

The present invention fulfills the above objectives by providing an air-guiding carrier type wind power collection device including a floating body and two air guiding tubes. The floating body includes a compartment filled with an uprising gas having a density lower than that of air. The floating body includes a floating assembly controlling a pressure and a temperature of the uprising gas received in the compartment. The air guiding tubes extend through the compartment of the floating body. Each air guiding tube has an air inlet and an air outlet at two ends thereof outside the compartment. The air outlet of each air guiding tube includes a peripheral wall having a windward section and a guiding section. The peripheral wall of the air outlet has a cutout portion formed between the windward section and the guiding section. An air channel is formed between and in communication with the air inlet and the air outlet of each air guiding tube. A wind power generating assembly is mounted in each of the air channels.

The floating body includes an air-guiding portion having a main axis corresponding to the air inlets of the two air guiding tubes. The air-guiding portion includes arcuate cross sections perpendicular to a longitudinal axis along which the floating body extends. The air-guiding portion has a streamlined outline extending from an outer periphery of the floating body and imitating an airplane fuselage. The floating assembly includes a pressure resistant body and a temperature controlling unit connected to the pressure resistant body. The temperature controlling unit controls a temperature of a gas received in the pressure resistant member. The pressure resistant member includes an outer periphery, with an insulating layer provided on the outer periphery of the pressure resistant member to prevent heat loss.

The pressure resistant member is mounted in the compartment of the floating body. The pressure resistant member includes a chamber receiving an uprising gas the same as the uprising gas in the compartment. The uprising gas is in a high temperature/high pressure state. The pressure resistant member further includes a plurality of gas controlling units mounted to a peripheral wall of the pressure resistant member for controlling exchange of the uprising gas in the chamber and the uprising gas in the compartment. The temperature controlling unit is connected to the floating body and mounted to an outer periphery of the floating body. The temperature controlling unit includes a plurality of solar plates and a heating member connected to the plurality of solar plates, with the heating member extending into the chamber of the pressure resistant member. Furthermore, the floating body further includes a support having first and second ends. The first end of the support is fixed to a bottom side of the floating body. The second end of the support is adapted to be fixed to a ground. The support draws the floating body and includes a steel rope containing a cable.

The wind power generating assembly includes a vane unit and a generator. The vane unit is mounted in the air channel and located in the reduced section. The generator is connected to the vane unit by a transmission shaft located in the compartment of the floating body. The cutout portion forms the guiding section, with an uncut portion of the peripheral wall of the air outlet forming the windward section. A local high pressure area is formed on a surface of the windward section when ambient air flows through the windward section, and a local low pressure area is formed at the guiding section when the ambient air flows from the local high pressure area to the guiding section, thereby increasing the air inlet amount.

Moreover, a plurality of pairs of ailerons is provided on a lateral periphery of the floating body. The plurality of pairs of ailerons W is respectively arranged at middle and rear sections of the floating body. A swayable rudder further is provided on each aileron.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
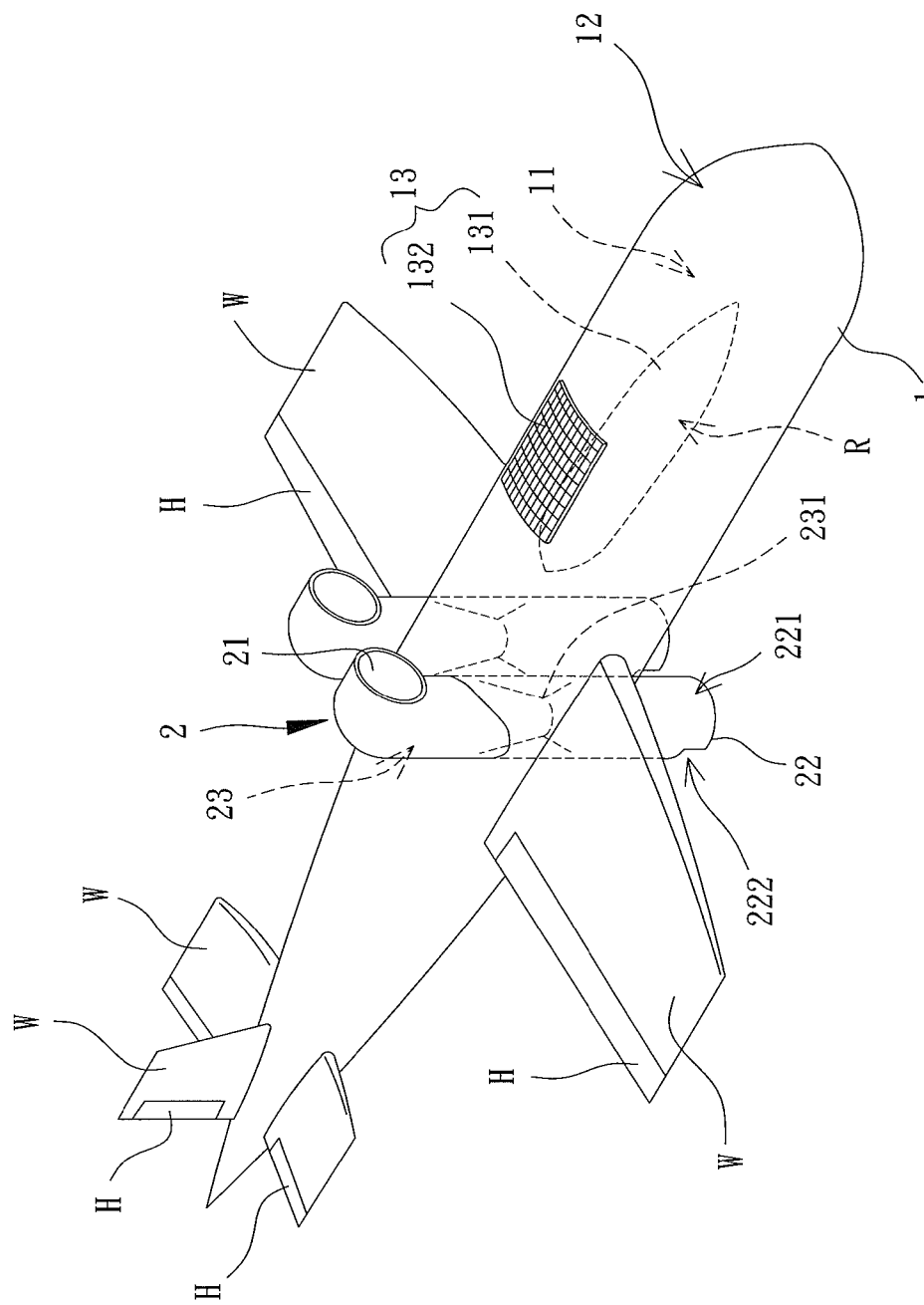
FIG. 1 shows a perspective view of an air-guiding carrier type wind power collection device according to the present invention.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "inner", "outer", "side", "portion", "section", "front", "middle", "rear", "longitudinal", "axial", "vertical", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
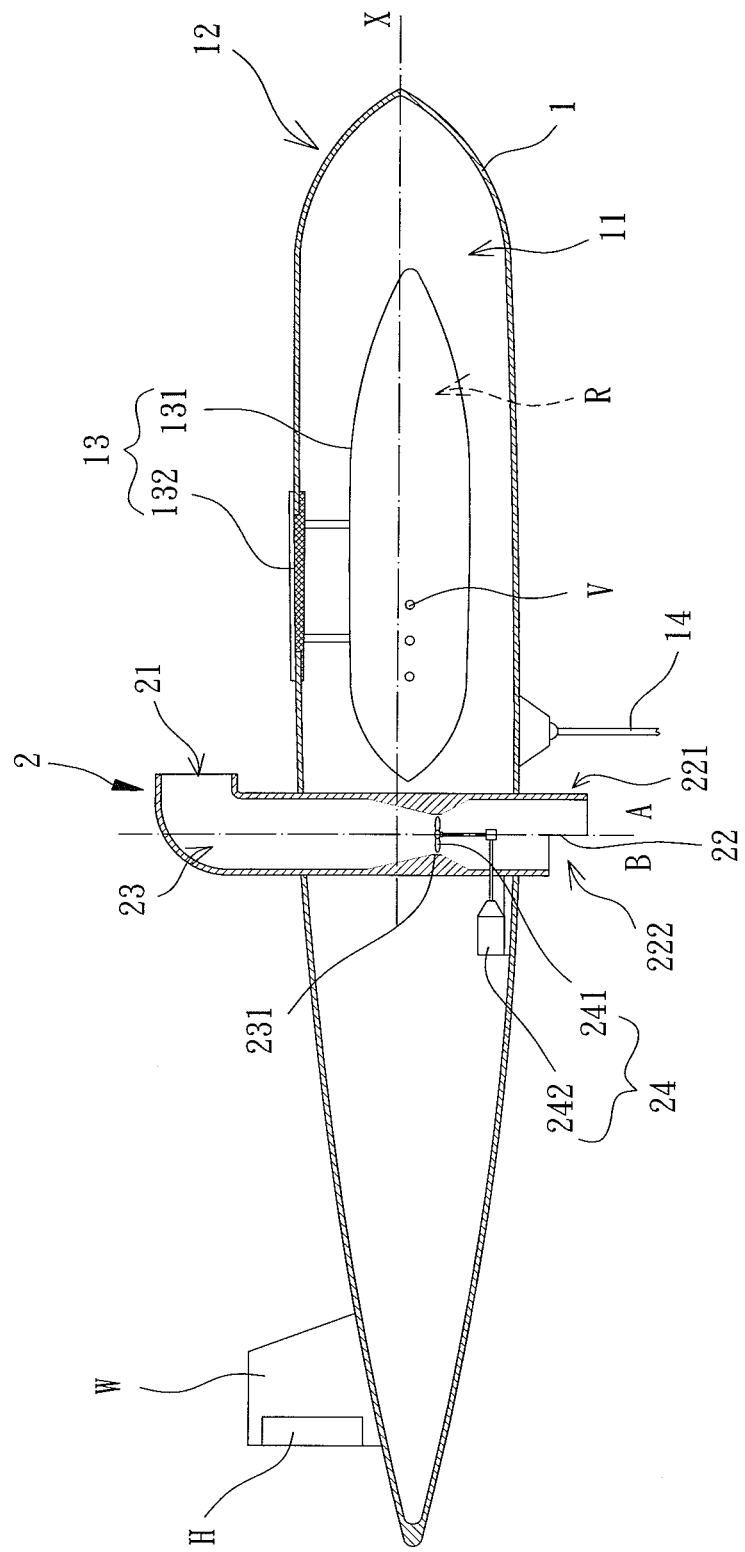
FIG. 2 shows a cross sectional view of the air-guiding carrier type wind power collection device according to the present invention.

FIGS. 1 and 2 illustrate an embodiment of an air-guiding carrier type wind power collection device according to the present invention. According to the form shown, the air-guiding carrier type wind power collection device includes a floating body 1 and two air guiding tubes 2 mounted to different sections of the floating body 1.

The floating body 1 is a soft object, such as a rubber balloon. Preferably, the floating body 1 is a plastic soft object with an aerodynamic configuration of an airplane and is filled with an uprising gas having a density smaller than the air. Preferably, the floating body 1 is filled with helium to provide the floating body 1 with suitable floating force to float in the air. Specifically, the floating body 1 includes a compartment 11 receiving the uprising gas at normal temperature/normal pressure to create strong floating force for keeping the floating body 1 in the air. In this embodiment, the floating body 1 includes an air-guiding portion 12 having a main axis corresponding to the air inlets of the two air guiding tubes 2. The air-guiding portion 12 includes arcuate cross sections perpendicular to a longitudinal axis X along which the floating body 1 extends (see FIG. 2). In this embodiment, the air-guiding portion 12 is similar to a nose cone of an airplane. Particularly, the air-guiding portion 12 preferably has a streamlined outline extending from an outer periphery of the floating body 1 and imitating an airplane fuselage to reduce resistance to the floating body 1 while guiding a large amount of upper air into the air guiding tubes 2. A plurality of pairs of ailerons W may be further provided on a lateral periphery of the floating body 1. In this embodiment, the plurality of pairs of ailerons W consists of a first pair of ailerons W and a second pair of ailerons W. The first pair of ailerons W is preferably similar to flaps of an airplane and arranged on a middle section of the floating body 1. The second pair of ailerons W is preferably similar to horizontal tail wings of an airplane and arranged on a rear section of the floating body 1. Additionally, an aileron W similar to a vertical tail wing of an airplane may be provided on the periphery of the floating body 1 at the rear section of the floating body 1. The ailerons W may create the necessary uprising force while reducing adverse effect to the floating body 1 resulting from the wind force and directional change in the upper air, allowing the floating body 1 to stably stay in the upper air. In the embodiment, a swayable rudder H may be further provided on each of the ailerons W for controlling the movement of the floating body 1 in the upper air, assuring the air inlets of the air guiding tubes 2 to face the flowing direction of the air current in the upper air. The floating body 1 may be divided into two sections by a plane formed by the longitudinal axis X. One of the sections containing the air-guiding portion 12 is made of rigid material to stabilize the air current flowing through the air-guiding portion 12, thereby reducing the air resistance and avoiding separation of the boundary layer flow as well as turbulence.

Furthermore, the floating body 1 includes a floating assembly 13 to control the pressure and temperature of the uprising gas in the compartment 11. The floating assembly 13 includes a pressure resistant member 131 and a temperature controlling unit 132 connected to the pressure resistant member 131. The temperature controlling unit 132 provides heat to a gas to be filled into the pressure resistant member 131.

In this embodiment, the pressure resistant member 131 is mounted in the compartment 11 of the floating body 1 and includes a chamber R receiving an uprising gas the same as that received in the compartment 11. Preferably, the chamber R is filled with high temperature/high pressure helium for adjusting the pressure and temperature of the gas in the compartment 11, achieving better efficiency in adjustment of the pressure and temperature of the gas in the compartment 11. The pressure resistant member 131 further includes a plurality of gas controlling units V mounted to a peripheral wall of the pressure resistant member 131 so as to communicate the chamber R of the pressure resistant member 131 with the compartment 11 of the floating body 1, allowing gas exchange between the chamber R and the compartment 11. The pressure resistant member 131 can be any container made of a material capable of resisting high temperature and high pressure and is preferably made of lightweight steel article of manufacture to resist the impact of the high temperature/high pressure gas. Particularly, the pressure resistant member 131 can be configured corresponding to the outline of the floating body 1. Furthermore, the outer periphery of the pressure resistant member 131 preferably provides thermally insulating effect, such as by providing an insulating layer (not shown) on the outer periphery of the pressure resistant member 131 to avoid heat loss in the chamber R. Further, the gas controlling units V can be connected to sensor activators, pumps, or the like to achieve gas exchange between the chamber R and the compartment 11, which can be appreciated by one skilled in the art and detailed description of which is not given to avoid redundancy.

The temperature controlling unit 132 is connected to the floating body 1 and preferably mounted to the outer periphery of the floating body 1 for supplying heat to the gas filled in the pressure resistant member 131. The temperature controlling unit 132 can be fixed to a top face (see FIG. 1) of the floating body 1 by such as bonding, gluing, etc. Preferably, the temperature controlling unit 132 is comprised of a plurality of solar plates arranged in a matrix. The solar plates directly absorb the solar energy and convert it into electricity and heat energy that can be utilized when desired, enhancing the absorbing efficiency of the solar energy. Further, the temperature controlling unit 132 is connected to the chamber R of the pressure resistant member 131 and heats the gas in the chamber R with the heat energy converted from the solar energy absorbed by the temperature controlling unit 132. The temperature controlling unit 132 can be of any type and shape. As an example, a heating member (not shown) can be connected to the solar plates and extends into the chamber R of the pressure resistant member 131 and abuts with the inner periphery of the pressure resistant member 131, increasing the heating efficiency of the chamber R of the pressure resistant member 131 by the temperature controlling unit 132.

Furthermore, the floating body 1 can include a support 14 connected to the ground for drawing the floating body 1. Preferably, the support 14 includes a steel rope containing a cable (not shown) and fixed to a bottom side of the floating body 1 (FIG. 2). Thus, the electricity converted from the wind power can be transmitted by the cable to the ground for use.

The air guiding tubes 2 are hollow tubes in the form of chimneys. The air guiding tubes 2 extend through the compartment 11 of the floating body 1 from upper surface to lower surface of the floating body 1. Each air guiding tube 2 has an air inlet 21 and an air outlet 22 on two ends thereof outside the compartment 11. The air inlet 21 faces the air-guiding portion 12 of the floating body 1. The air inlet 21 and the air outlet 22 are in communication with an air channel 23 inside the air guiding tube 2. The air channel 23 allows passage of upper air current. In this embodiment, the air outlet 22 of the air guiding tube 2 includes a peripheral wall having a windward section 221 and a guiding section 222. The windward section 221 and the guiding section 222 have an air pressure difference therebetween to create a stack effect, increasing the air inlet amount.

The peripheral wall of the air outlet 22 preferably has a cutout portion formed between the windward section 221 and the guiding section 222, with the uncut portion of the peripheral wall forming the windward section 221, and with the cutout portion forming the guiding section 222. Thus, when the ambient air flows through the windward section 221, a local high pressure area A is formed on the surface of the windward section 221. When the ambient air flows from the local high pressure area A to the guiding section 222, a local low pressure area B is formed at the guiding section 222. Due to the pressure difference between the local high pressure area A and the local low pressure area B, the air current flowing through the guiding section 222 generates a vortex pair and creates the stack effect at the air outlet 22, driving the air out of the air channel 23 and, hence, providing a rapid wind collecting effect.

Furthermore, the air channel 23 can include a reduced section 231 between the air inlet 21 and the air outlet 22. The reduced section 231 has the minimum cross sectional diameter in the air channel 23. The reduced section 231 is formed by gradually reducing the inner diameter of the air guiding tube 2 to form an hourglass-shaped structure. Specifically, the inner diameter of the air guiding tube 2 gradually decreases from the air inlet 21 towards the reduced section 231 and then gradually increases from the reduced section 231 towards the air outlet 22 where a restoration area is formed. By such an arrangement, the wind collecting effect of the air channel 23 can be increased. The flow rate of the air current flowing from the air inlet 21 through the air outlet 22 is increased. Thus, a large amount of air can flow through the air channel 23 in a short period of time.

With reference to FIG. 2, a wind power generating assembly 24 is mounted in the air channel 23 of each air guiding tube 2 for utilizing the wind energy of the upper air collected by the air guiding tube 2. In this embodiment, the wind power generating assembly 24 includes a van unit 241 and a generator 242. The vane unit 241 is mounted in the air guiding tube 2 and preferably in the reduced section 231 to increase the rotating speed of the vane unit 241 for outputting the shaft work through the air current that is accelerated while flowing through the reduced section 231. The vanes of the vane unit 241 is preferably located in a direction easily receiving the wind to use the high-speed air current in the air channel 23 to drive the vanes of the vane unit 241 to rotate at high speed, generating mechanical energy in the form of shaft work. The generator 242 is connected to the vane unit 241 by a transmission shaft that is preferably located outside of the path of the air current in the air channel 23. Particularly, the transmission shaft can be mounted in the compartment 11 of the floating body 1 or to the outer periphery of the floating body 1 to avoid an increase in the resistance to the airflow if the transmission shaft were mounted in the air channel 23. By such an arrangement, the air current can be rapidly guided into the air channel 23 and drives the vane unit 241 to generate mechanical energy that is converted by the generator 242 into electricity, effectively utilizing the natural wind in the upper air to generate electricity. Furthermore, the vane unit 241 can be used as an auxiliary air pump when the ambient air is insufficient. Specifically, the vane unit 241 can be activated to increase the flow rate of the upper air current entering the air guiding tube 2, maintaining the air guiding tube 2 in the best state for receiving air current. Thus, the generator 242 can continuously generate electricity in the upper air.

Figure 3:
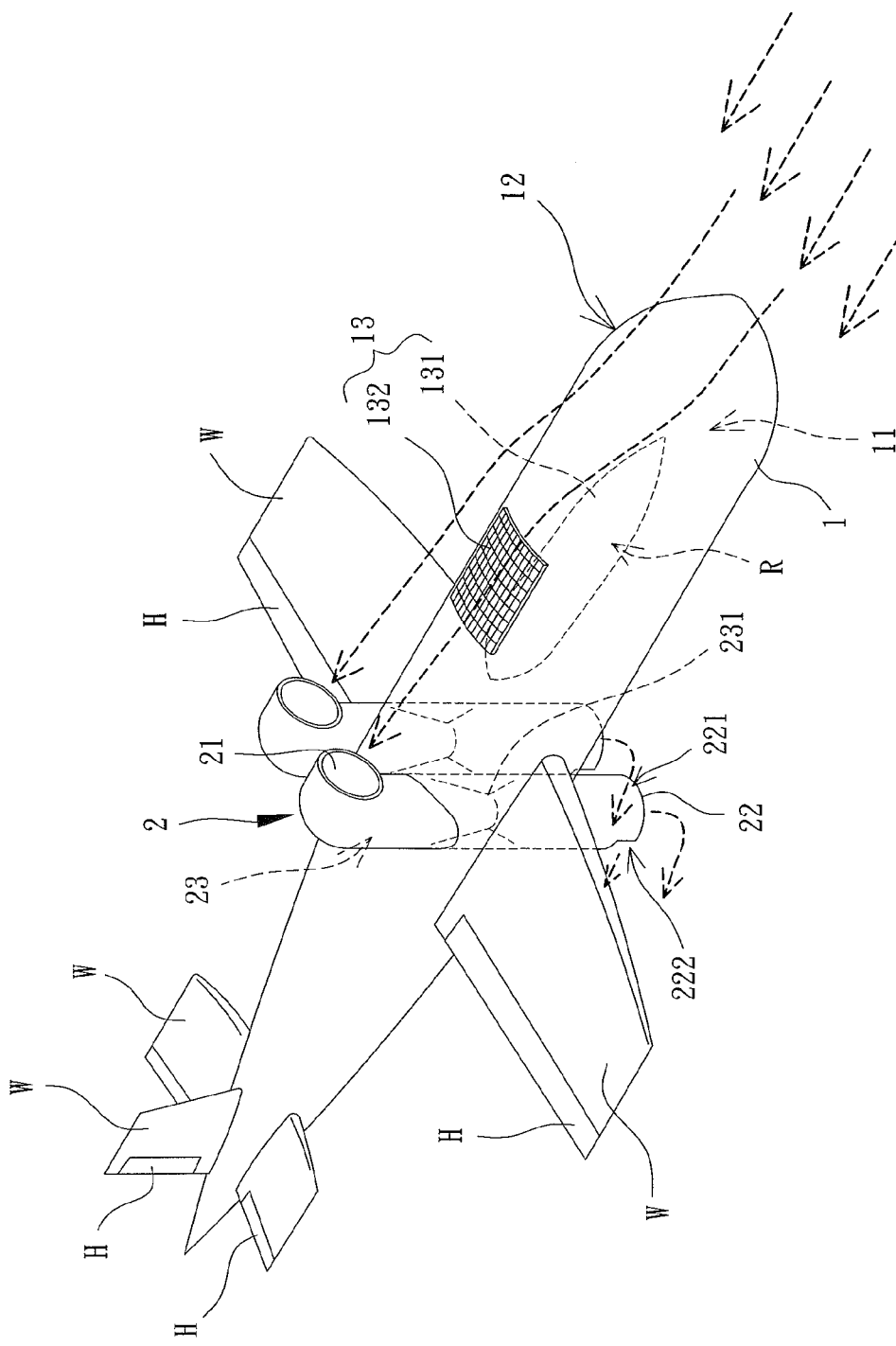
FIG. 3 is a perspective view illustrating operation of the air-guiding carrier type wind power collection device according to the present invention.
Figure 4:
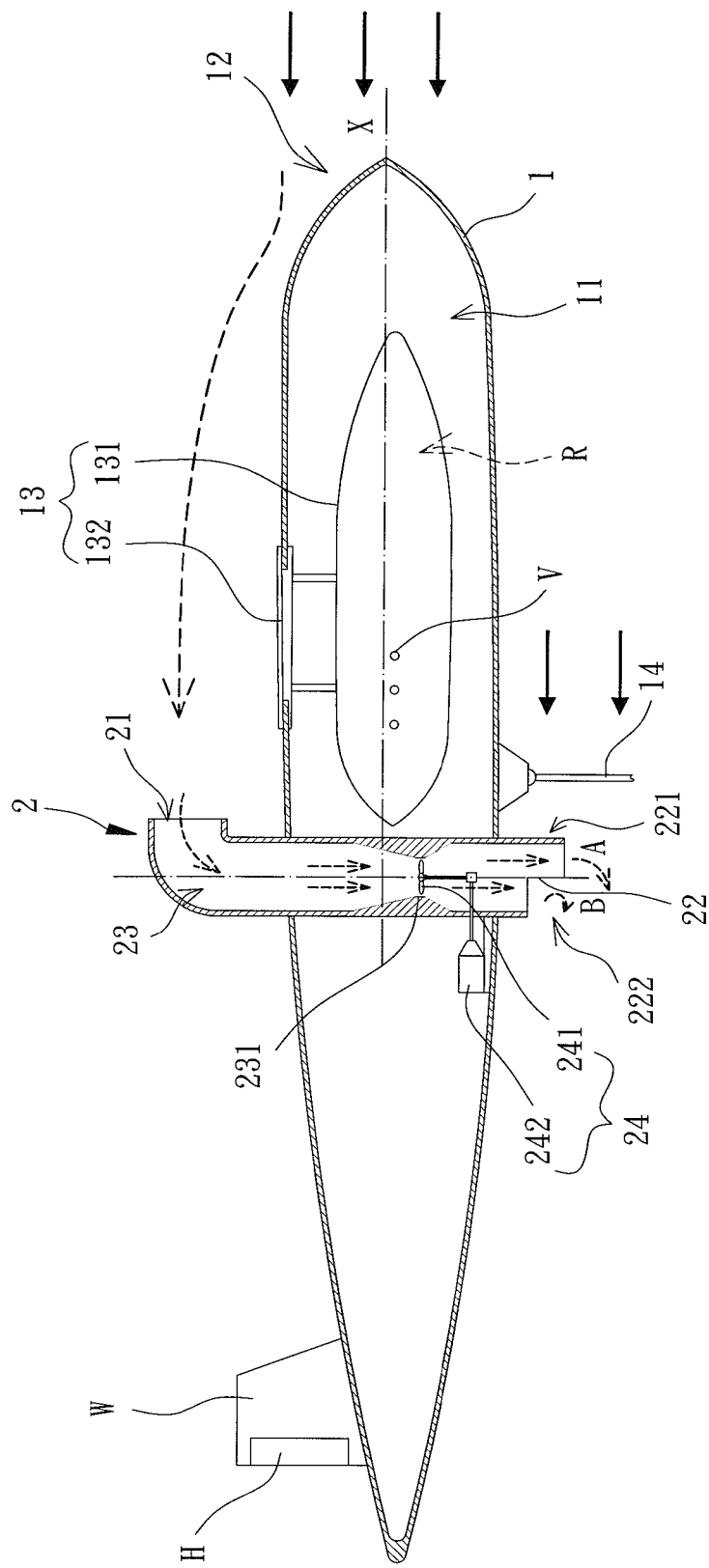
FIG. 4 is a cross sectional view illustrating operation of the air-guiding carrier type wind power collection device according to the present invention.

With reference to FIGS. 3 and 4, in use of the air-guiding carrier type wind power collection device according to the present invention, the compartment 11 of the floating body 1 is filled with normal temperature/normal pressure helium, and the chamber R of the pressure resistant member 131 is filled with high temperature/high pressure helium. Since the density of helium is lower than the air and since the temperature of the helium in the floating body 1 is higher than the ambient air, the carrier is provided with floating force and, thus, moves into the upper air, with the support 14 drawing the carrier to a suitable floating direction in the upper air. The ailerons W on the floating body 1 imitating an airplane fuselage provide the floating body 1 with stability and uprising force to stay in the upper air. Through adjustment and controlling of the floating assembly 13 to balance the temperature and pressure of the uprising gas in the compartment 11 of the floating body 1 to keep a suitable temperature difference between the compartment 11 and the ambient air, the floating body 1 can stably stay in the upper air having strong wind and high velocity.

While the floating body 1 stably stays in the upper air, the upper air current flows from the air-guiding portion 12 along the floating body 1 imitating a streamlined fuselage of an airplane into the air guiding tubes 2. Furthermore, since the windward sections 221 formed at the air outlets 22 of the air guiding tubes 2 face the flowing direction of the incoming ambient air current, the ambient air current flows through each windward section 221 and forms the local high pressure section A on each windward section 221. Due to the air pressure gradient, the air current at the local high pressure section A is automatically accelerated while flowing through the cutout portion of each air outlet 22, thereby creating the local low pressure section B on the guiding section 222 of the air outlet 22 of each air guiding tube 2. Separation of the boundary layer flow of the air current finally occurs at each guiding section 222, leading to generation of vortex airflow at each guiding section 222. Since a stack effect is obtained due to the pressure difference between the air outlet 22 and the air channel 23, the air current flowing through the air channel 23 of each air guiding tube 2 can rapidly exit the air guiding tube 2, and a large amount of air airflows continuously enters the air inlet 21 of each air guiding tube 2. This allows rapid flowing of the air current in each air channel 23. Under the law of conservation of energy and mass, the air current is accelerated while passing through the reduced section 231 of each air channel 23, so that the single-stage or multi-stage vanes of the vane unit 241 in each air guiding tube 2 can directly be driven by strong air current to rotate, generating mechanical energy that is converted by the generator 242 into electricity. Effective use of the wind energy in the upper air for generating electricity is thus achieved.

Figure 5:
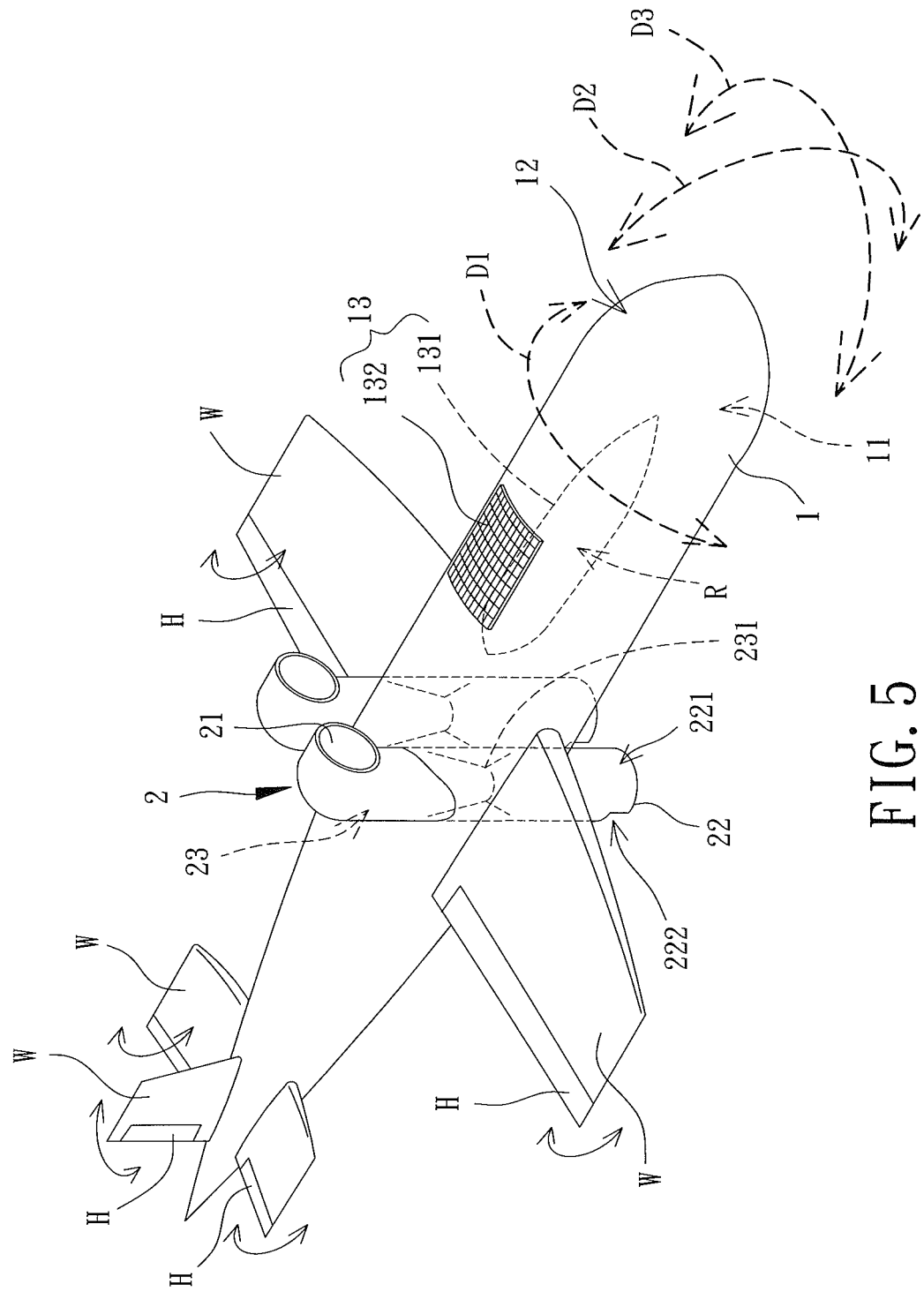
FIG. 5 is a perspective view illustrating controlling of the air-guiding carrier type wind power collection device according to the present invention.

With reference to FIG. 5, when the air-guiding carrier type wind power collection device according to the present invention is subjected to a changeable climate in the upper air, the floating body 1 can be controlled to roll, tilt, and sway through control of the rudders H on the ailerons W. Thus, the air-guiding carrier type wind power collection device according to the present invention can stably float in the upper air and continuously draws in air current in response to various environments having changeable upper-air climates, changeable wind powers, and changeable wind directions, achieving enhanced wind power generating efficiency in the upper air. As an example, the rudders H on the ailerons W can be controlled to sway up and down so as to control the floating body 1 to roll (see route D1 in FIG. 5). As another example, the rudders H on the ailerons W can be controlled to sway up and down so as to control the floating body 1 to tilt (see route D2 in FIG. 5). As a further example, the rudders H on the ailerons W can be controlled to sway up and down so as to control the floating body 1 to rock (see route D3 in FIG. 5). The operation to control the rudders H on the ailerons W of the airplane-shaped structure can be appreciated by one skilled in the art, detailed description of which is, thus, omitted to avoid redundancy.

In view of the foregoing, through use of the air guiding tubes 2 on the floating body 1 of the air-guiding carrier type wind power collection device according to the present invention, a stack effect can be created in the air outlet 22 of each air guiding tube 2 when the floating body 1 rises to the upper air area having strong wind energy, increasing the efficiency in guiding the upper air current into each air guiding tube 2. At the same time, through the air-guiding portion 12 imitating the streamlined fuselage of an airplane along the floating body 1, the high-speed airflow in each air channel 23 impacts the vane unit 241 and drives the single-stage or multi-stage vanes of the vane unit 241 to rotate, generating mechanical energy that is converted by the generator 242 into electricity. Thus, the wind power generating efficiency in the upper air is increased. Furthermore, through provision of the floating assembly 13 in the floating body 1 and timely gas exchange between the compartment 11 and the chamber R, the height of the wind power collection device according to the present invention can be actively adjusted to maintain the temperature difference between the gas in the compartment 11 and the ambience, stably keeping the wind power collection device according to the present invention in the upper air having strong wind so as to collect the abundant wind energy.

In the air-guiding carrier type wind power collection device according to the present invention, the wind energy in the upper air can effectively be collected and used to increase the velocity and density of the air current, increasing the wind power generating efficiency.

In the air-guiding carrier type wind power collection device according to the present invention, the adverse effect by the strong wind and directional change of the air current in the upper air can be avoided, and the wind power collection device can stably stay at a suitable height in the upper air through active adjustment of the height.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An air-guiding carrier type wind power collection device comprising:

a floating body including a compartment filled with an uprising gas having a density lower than that of air, with the floating body including a floating assembly, with the floating assembly controlling a pressure and a temperature of the uprising gas received in the compartment; and two air guiding tubes extending through the compartment of the floating body, with each of the two air guiding tubes having an air inlet and an air outlet at two ends thereof outside the compartment, with the air outlet of each of the two air guiding tubes including a peripheral wall having a windward section and a guiding section, with the peripheral wall of the air outlet having a cutout portion formed between the windward section and the guiding section, with an air channel formed between and in communication with the air inlet and the air outlet of each of the two air guiding tubes, with a wind power generating assembly mounted in each of the air channels.

2. The air-guiding carrier type wind power collection device as claimed in claim 1, with the floating body including an air-guiding portion, with the air-guiding portion including a main axis corresponding to the air inlets of the two air guiding tubes, with the air-guiding portion including arcuate cross sections perpendicular to a longitudinal axis along which the floating body extends, with the air-guiding portion having a streamlined outline extending from an outer periphery of the floating body and imitating an airplane fuselage.

3. The air-guiding carrier type wind power collection device as claimed in claim 1, with a plurality of pairs of ailerons provided on a lateral periphery of the floating body, with the plurality of pairs of ailerons respectively arranged at middle and rear sections of the floating body, with a swayable rudder further provided on each aileron.

4. The air-guiding carrier type wind power collection device as claimed in claim 1, with the air channel in each of the two air guiding tubes including a reduced section between the air inlet and the air outlet, with the reduced section having a minimum cross sectional diameter in the air channel.

5. The air-guiding carrier type wind power collection device as claimed in claim 4, with the wind power generating assembly including a vane unit and a generator, with the vane unit mounted in the air channel and located in the reduced section, with the generator connected to the vane unit by a transmission shaft located in the compartment of the floating body.

6. The air-guiding carrier type wind power collection device as claimed in claim 1, with the cutout portion forming the guiding section, with an uncut portion of the peripheral wall of the air outlet forming the windward section.

7. The air-guiding carrier type wind power collection device as claimed in claim 1, with a local high pressure area formed on a surface of the windward section when ambient air flows through the windward section, with a local low pressure area formed at the guiding section when the ambient air flows from the local high pressure area to the guiding section.

8. The air-guiding carrier type wind power collection device as claimed in claim 1, with the floating assembly including a pressure resistant body and a temperature controlling unit connected to the pressure resistant body, with the temperature controlling unit controlling a temperature of a gas received in the pressure resistant member, with the pressure resistant member including an outer periphery, with an insulating layer provided on the outer periphery of the pressure resistant member.

9. The air-guiding carrier type wind power collection device as claimed in claim 8, with the pressure resistant member mounted in the compartment of the floating body, with the pressure resistant member including a chamber receiving an uprising gas the same as the uprising gas in the compartment, with the uprising gas being in a high temperature/high pressure state.

10. The air-guiding carrier type wind power collection device as claimed in claim 8, with the pressure resistant member further including a plurality of gas controlling units mounted to a peripheral wall of the pressure resistant member, with the plurality of gas controlling units controlling exchange of the uprising gas in the chamber and the uprising gas in the compartment.

11. The air-guiding carrier type wind power collection device as claimed in claim 8, with the temperature controlling unit connected to the floating body and mounted to an outer periphery of the floating body, with the temperature controlling unit including a plurality of solar plates and a heating member connected to the plurality of solar plates, with the heating member extending into the chamber of the pressure resistant member.

12. The air-guiding carrier type wind power collection device as claimed in claim 1, with the floating body further including a support having first and second ends, with the first end of the support fixed to a bottom side of the floating body, with the second end of the support adapted to be fixed to a ground, with the support drawing the floating body, with the support including a steel rope containing a cable.

* * * * *